April 5, 1966 L. R. GUTE 3,244,917
DYNAMOELECTRIC MACHINE
Filed July 25, 1962 3 Sheets-Sheet 1

INVENTOR.
Loren R. Gute
BY
W. E. Finken
HIS ATTORNEY

April 5, 1966     L. R. GUTE     3,244,917
DYNAMOELECTRIC MACHINE

Filed July 25, 1962     3 Sheets-Sheet 2

INVENTOR.
Loren R. Gute
BY
W. E. Finker
HIS ATTORNEY

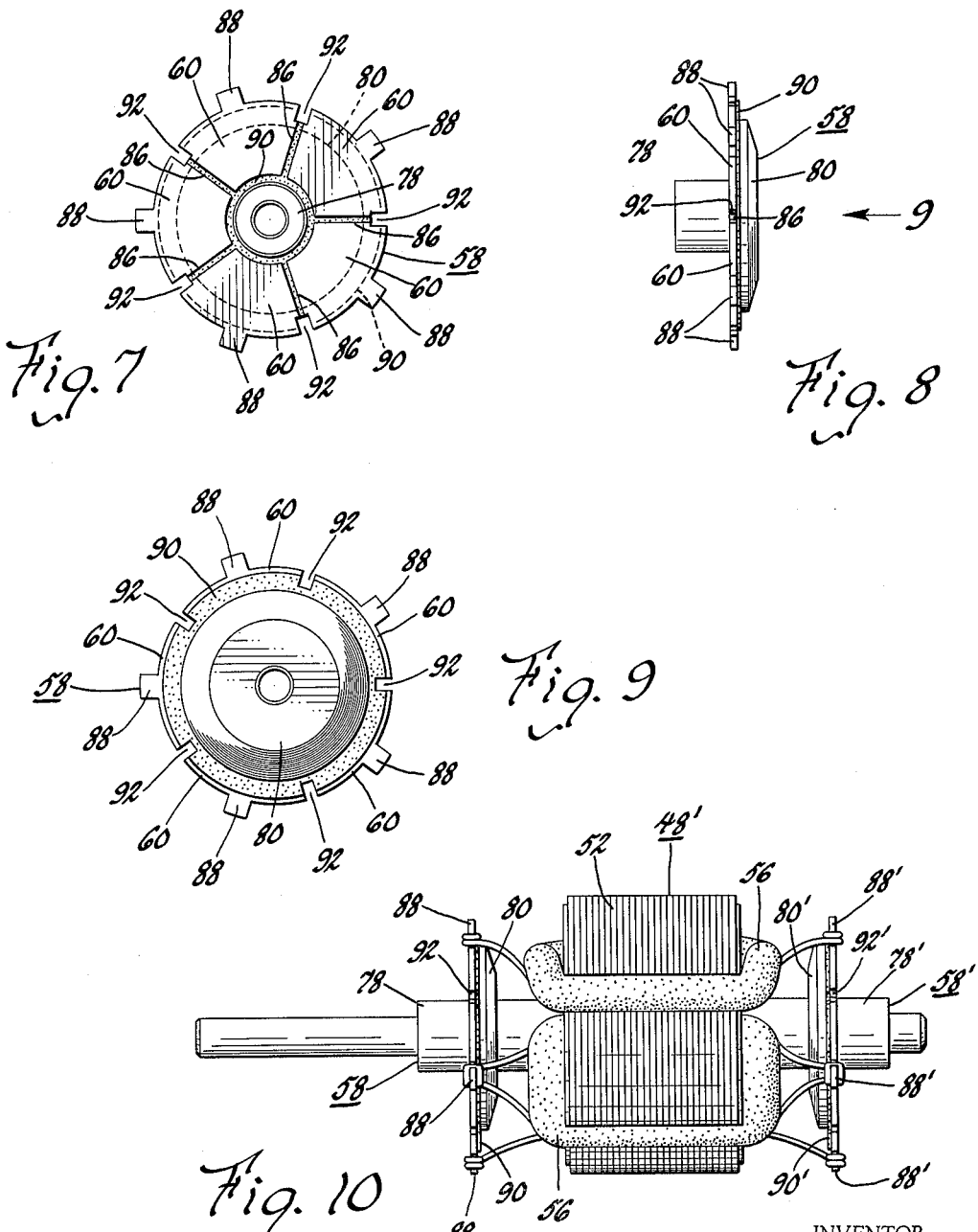

United States Patent Office 3,244,917
Patented Apr. 5, 1966

3,244,917
DYNAMOELECTRIC MACHINE
Loren R. Gute, Fairport, N.Y., assignor to General Motors Corporation, Detroit, Mich., a corporation of Delaware
Filed July 25, 1962, Ser. No. 212,293
3 Claims. (Cl. 310—154)

This invention pertains to dynamoelectric machines, and particularly to an improved permanent magnet direct current electric motor.

Heretofore, direct current motors having permanent magnets have been designed, but have not come into wide usage due to the cost of manufacture thereof. The present invention relates to a simplified and economical direct current motor having a permanent magnet field, disc-type commutator means, an improved brush holder assembly and simplified self-aligning bearings. Accordingly, among my objects are the provision of an improved permanent magnet field-type dynamoelectric machine; the further provision of a permanent magnet direct current electric motor having a disc-type commutator; the further provision of a motor of the aforesaid type wherein the brushes are carried by an end cap; the further provision of a motor of the aforesaid type including a double disc commutator arrangement for energizing the forward and reversing energizing circuits; and the still further provision of a motor of the aforesaid type including sleeve-type self-aligning bearings.

The aforementioned and other objects are accomplished in the present invention by utilizing an annular ceramic-type permanent magnet as the field, and bearing mounting the armature in a pair of end caps composed of insulating material. Specifically, the improved dynamoelectric machine comprises a cylindrical sheet metal casing having an annular ceramic-type permanent magnet cemented thereto and defining an annular air gap with a wound armature. Opposite ends of the case assembly are closed by plastic end caps which carry sleeve-type bearings having tapered through bores for self-aligning purposes.

In a motor designed for unidirectional rotation, a single disc commutator is attached to the armature shaft, the commutator being engaged by a pair of diametrically opposed brushes carried by one of the end caps. The brushes are mounted in hollow rivets and spring biased against the face of the commutator. In a motor designed for reversible rotation, the armature assembly has separate field windings and a pair of disc commutators attached to opposite ends thereof, and both end cap assemblies carry a pair of brushes for engagement therewith.

Further objects and advantages of the present invention will be apparent from the following description, reference being had to the accompanying drawings, wherein preferred embodiments of the present invention are clearly shown, and wherein similar numerals depict similar parts throughout the several views.

In the drawings:

FIGURES 7 and 8 are elevational front and side views, respectively, of the completed commutator assembly.

FIGURE 9 is a rear elevational view of a commutator assembly taken in the direction of arrow 9 of FIGURE 8.

FIGURE 10 is a side elevational view of an armature assembly for a reversible motor constructed according to a second embodiment of the present invention.

Figure 2:
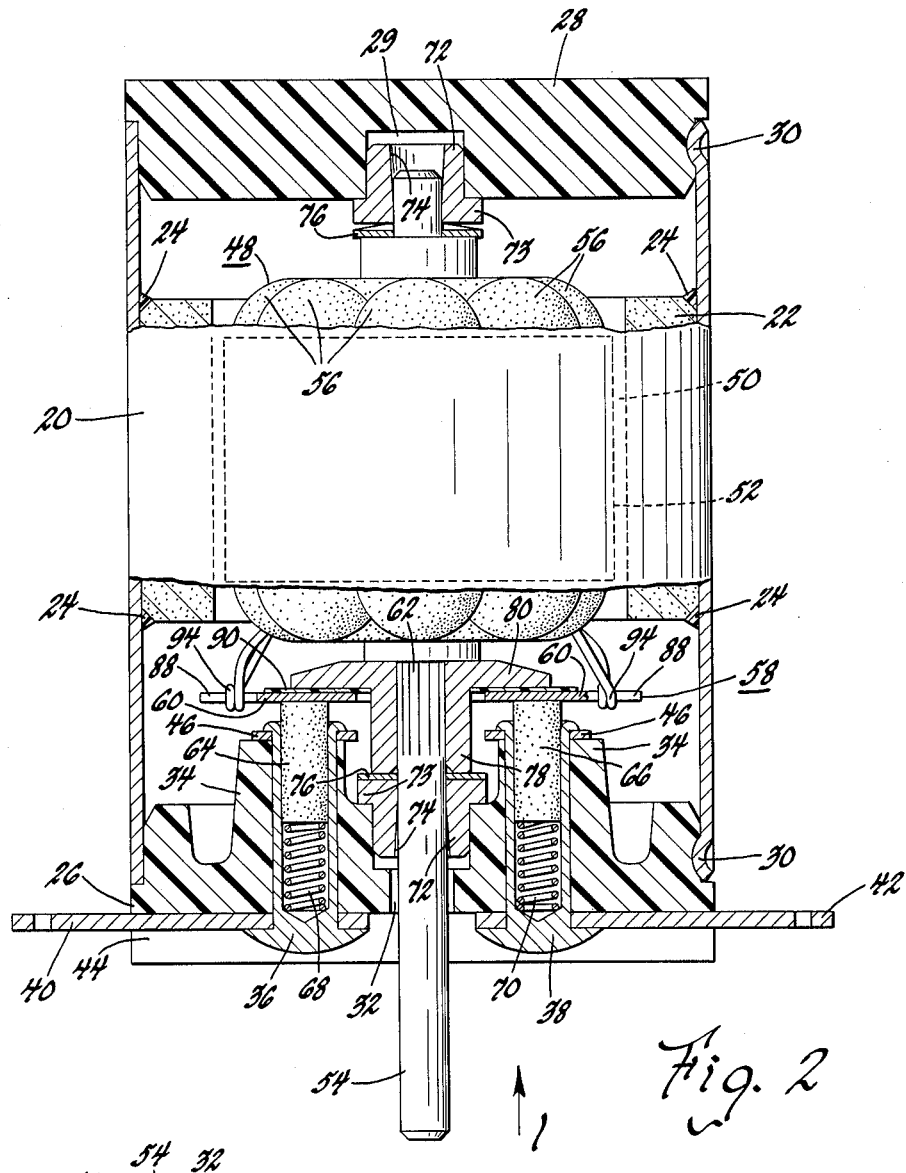
FIGURE 2 is an enlarged longitudinal view, partly in section and partly in elevation, taken generally along line 2—2 of FIGURE 1.
Figure 1:
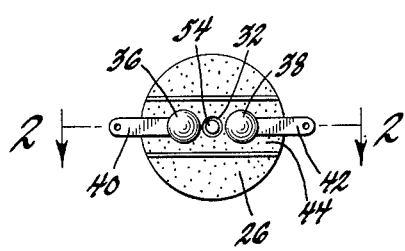
FIGURE 1 is an end view of a dynamoelectric machine constructed according to the one embodiment of this invention.

With particular reference to FIGURES 1 and 2, in one embodiment of the present invention the dynamoelectric machine comprises a unidirectional direct current motor having an annular sheet metal case 20 with an annular ceramic-type permanent magnet 22 held in assembled relation with the case 20 by a suitable adhesive cement indicated at 24. Before the armature is assembled with the case, the permanent magnet 22 is magnetized radially so as to have diametrically opposed poles of opposite polarity.

The ends of the case assembly, comprising the case 20 and the annular permanent magnet 22, are closed by insulative end caps 26 and 28 composed of a suitable plastic material, such as Bakelite or Delrin. The case 20 is secured to the end caps 26 and 28 by a plurality of circumferentially spaced dimples, or stakes, 30.

The end cap 26 has a central stepped through bore 32 and a pair of radially spaced, diametrically opposed through bored bosses 34 which receives tubular rivets 36 and 38. The end cap 28 has a central recess 29. A pair of terminals 40 and 42 are clamped between the heads of the rivets 36 and 38, respectively, and the face of the end cap 26, the rivet heads and the terminals being situated at a diametrical groove 44 in the end cap 26. The tubular inner ends of the rivets 36 and 38 are peened over washer 46 so as to maintain the rivets and the terminals in rigid assembled relation with the end of cap 26.

A wound armature assembly 48 is journalled in the end caps 26 and 28, and defines an annular air gap 50 with the annular permanent magnet 22. The armature assembly 48 comprises a stack of laminae 52 held in assembled relation with a shaft 54 and carrying five coils 56, all wound in the same direction. A disc commutator assembly 58 having five circumferentially spaced commutator segments 60 is attached to the armature shaft 54 by a press fit on a knurled portion 62 thereof, each coil 56 of the armature being connected to a commutator segment. Brushes 64 and 66 are slidably mounted in the tubular portions of the rivets 36 and 38, respectively, the brushes 64 and 66 being urged axially outward by coil springs 68 and 70, respectively, so as to engage the commutator segments 60.

A sleeve-type, lubricant impregnated self-aligning bearing 72 is press fitted into each end cap assembly 26 and 28, the sleeve bearings 72 having tapered through bores 74 for receiving the armature shaft 54. The bearings 72 are properly located by having shoulders 73 thereof pressed flush against their respective end caps. The tapered through bores 74 in the sleeve bearings 72 facilitate self-alignment of the armature shaft with both bearings, and armature end thrust is taken up by a pair of washers 76.

Figure 3:
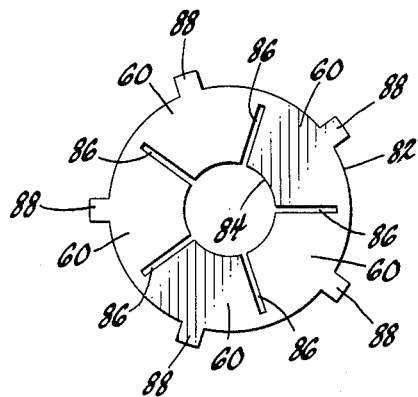
FIGURES 3 and 4 are elevational front and side views, respectively, of the commutator segment blank.
Figure 4:
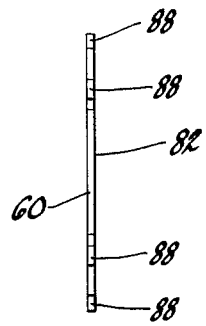
Figure 5:
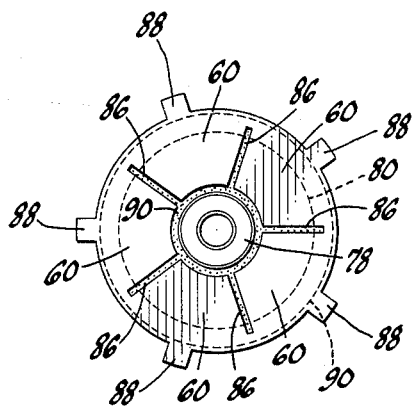
FIGURES 5 and 6 are elevational front and side views, respectively, of the commutator assembly prior to separating the segments thereof.
Figure 6:
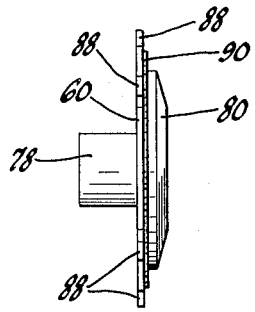

Referring to FIGURES 3 through 9, the commutator assembly 58 comprises an aluminum hub 78 having a flange 80. The commutator segments 60 are formed from a substantially circular sheet of copper 82, as shown in FIGURES 3 and 4, by forming a central aperture 84 in the sheet 82 with five circumferentially spaced radial extending slots 86. Each segment 60 is formed with a radial extending tab 88. This plate 82 is attached to the flange 80 of the aluminum hub 78 by an annulus 90 of insulative bonding film, this assembly requiring the plate 82 to be pressed against the flange 80 of the hub 78 with a uniform pressure of substantially 50 p.s.i. at a temperature of 205° C. for a one minute interval. As is apparent in FIGURES 5 and 7, the diameter of plate 82 is greater than the diameter of the flange 80, and the slots 86 terminate radially outward of the flange 80. Thereafter, the periphery of the plate 82 and bonding film 90 are notched at 92 to form the circumferentially spaced commutator segments 60.

In the embodiment shown in FIGURE 1, two turns of each armature coil 56 are wrapped around their respective commutator segment tab 88 and thereafter soldered thereto. Thus, as shown in FIGURE 2, the coils 56 are shown having two turns 94 wrapped around the tabs 88 and soldered thereto. The direction of rotation of the unidirectional motor shown in FIGURE 2 is, of course, determined by the polarity of the direct current power supplied to the terminals 40 and 42.

Referring to FIGURE 10, an armature assembly 48' constructed according to the second embodiment of this invention is shown having a commutator assembly 58 attached to the left hand end and a commutator assembly 58' attached to the right hand end of the armature shaft 54. In the armature assembly 48' of FIGURE 10, the forward and reverse energizing circuits are completely separated and energized from separate commutators 58 and 58'. Thus, the armature assembly 48' has ten coils 56 all wound in the same direction, five of the coils being connected to the tabs 88 of the commutator segments 60 of the commutator assembly 58, and the other five coils being connected to tabs 88' of the commutator segments 60' of the commutator assembly 58'. Thus, five coils of the armature assembly 48' are used for forward rotation, and the other five coils are used for reverse rotation. The case assembly for the modified armature assembly in FIGURE 1 would, of course, embody two end caps carrying a pair of brushes constructed in the manner of the end cap 26 as shown in FIGURE 2.

While the embodiments of the invention as herein disclosed constitute preferred forms, it is to be understood that other forms might be adopted.

What is claimed is as follows:

1. A dynamoelectric machine including, a tubular case having a permanent magnet field, an insulative end cap secured to each end of said tubular case, an armature assembly having a shaft journalled in said end caps and defining an air gap with said permanent magnet field, a disc commutator attached to said armature shaft, and brush means carried by one of said end caps for engagement with said disc commutator, said brush means comprising a pair of brushes, a pair of tubular rivets carried by said one end cap, said brushes being slidably supported within said tubular rivets, and spring means disposed in said tubular rivets for maintaining said brushes in engagement with said disc commutator under spring pressure.

2. The dynamoelectric machine set forth in claim 1 wherein said one end cap has a pair of through bored bosses, and wherein said tubular rivets extend through said through bored bosses for securing a pair of terminals to said end cap.

3. A brush holder and terminal assembly for a dynamoelectric machine including, an insulative end cap having a pair of diametrically opposed through bored bosses, a pair of rivets having tubular portions extending through said bosses and having their inner ends peened over said bosses, a pair of terminals clamped between the heads of said rivets and the outer faces of said end cap, and spring biased brushes slidably mounted in the tubular portions of said rivets and extending axially from the inner face of said end cap.

References Cited by the Examiner

UNITED STATES PATENTS

| | | | |
|---|---|---|---|
| 770,073 | 9/1904 | Kennedy | 310—138 |
| 2,627,583 | 2/1953 | Clark | 310—70 |
| 2,662,194 | 12/1953 | Jepson | 310—247 X |
| 2,674,904 | 4/1954 | Dickson | 308—72 |
| 2,692,345 | 10/1954 | Wahlberg | 310—239 X |
| 2,796,472 | 6/1957 | Carter | 200—166 |
| 2,894,156 | 7/1959 | Kent | 310—239 X |

FOREIGN PATENTS

| | | |
|---|---|---|
| 568,157 | 6/1958 | Belgium. |
| 1,150,199 | 8/1957 | France. |
| 284,673 | 8/1928 | Great Britain. |

ORIS L. RADER, *Primary Examiner.*

MILTON O. HIRSHFIELD, *Examiner.*

D. X. SLINEY, *Assistant Examiner.*